Nov. 25, 1924.                                                  1,517,001
L .F. FULLER
FISHPLATE AND NUT LOCK
Filed July 16, 1923
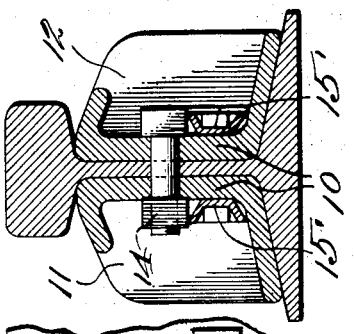
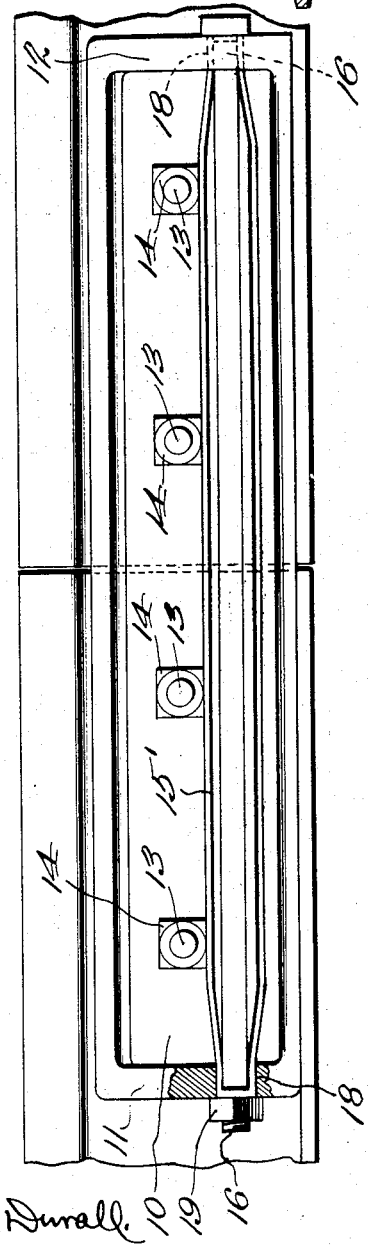
L. F. Fuller,
INVENTOR
BY Victor J. Evans
ATTORNEY Patented Nov. 25, 1924.

1,517,001

UNITED STATES PATENT OFFICE.

L F. FULLER, OF TERRY, MISSISSIPPI.

FISHPLATE AND NUT LOCK.

Application filed July 16, 1923. Serial No. 651,961.

*To all whom it may concern:*

Be it known that I, L F. FULLER, a citizen of the United States, residing at Terry, in the county of Hinds and State of Mississippi, have invented new and useful Improvements in Fishplate and Nut Locks, of which the following is a specification.

The object of this invention is to provide a special type of fish plate with which a nut retaining device directly cooperates.

A further object is to provide a fish plate having a longitudinal flange, or flanges, end portions, and an expansible bar extending between one of said flanges and the nuts carried by the usual bolts securing the rails.

With the foregoing and other objects in view, the invention consists in the novel construction and arrangement of elements described and claimed, it being understood that modifications may be made within the scope of the claims without departing from the spirit of the invention.

In the drawings, Figure 1 shows the fish plate and nut lock in side elevation; Figure 2 is a vertical transverse section through two fish plates and a rail; Figure 3 is a perspective view of a form which may be rolled or stamped from sheet metal; Figure 4 is a perspective view of the locking bar.

In carrying out the invention I provide a fish plate 10, shown in Figure 1 as being of heavy metal, and shown at 10' in Figure 3 as being of sheet or rolled metal. The plate includes end portions 11 and 12 disposed perpendicularly with reference to the web and is provided with bolt holes for the bolts 13 retained by nuts 14.

A locking bar 15' is of channel form, the web of the channel being against the web of fish plate 10, and the ends of the channel bar passing through openings 18 in end members 11 and 12, any suitable retaining device or devices being employed.

The flanges of element 15' are bent outwardly to engage the nuts 14 and the base flange of fish plate 10, this spreading or expansion of locking bar 15' preventing the loosening of the nuts.

In the modification of Figure 3, the fish plate 10' of rolled metal is shown as having one end bent at right angles with the web, and both ends are provided with apertures 18 for the channel bar 15', which is inserted after bolts 13 and nuts 14 have been applied in the usual manner.

After passing bar 15' through openings 18, the flanges may be flared to engage respectively the nuts, (or some of them), and the lower flange of splice bar 10'. The ends of element 15' may be secured to the splice bar in any obvious manner.

By the use of either form of this device, the nuts are securely retained until intentionally loosened by withdrawing the bar.

What is claimed is:—

1. The combination with a fish plate, comprising a web, lower flange, and end members, of an expansible locking bar, to be passed through said end members and contact with the lower flange, and adapted to engage the nut of a bolt to be passed through the fish plate.

2. The combination with a fish plate, comprising a web, lower flange, and end members, of an expansible channel shaped locking bar, to be passed through said end members and contact with the lower flange, and adapted to engage an element for securing the fish plate.

In testimony whereof I affix my signature.

L F. FULLER.